Feb. 26, 1963
M. N. MOORE
3,079,518
ALTERNATING CURRENT INDUCTION MOTOR
Filed Dec. 22, 1959
2 Sheets-Sheet 1
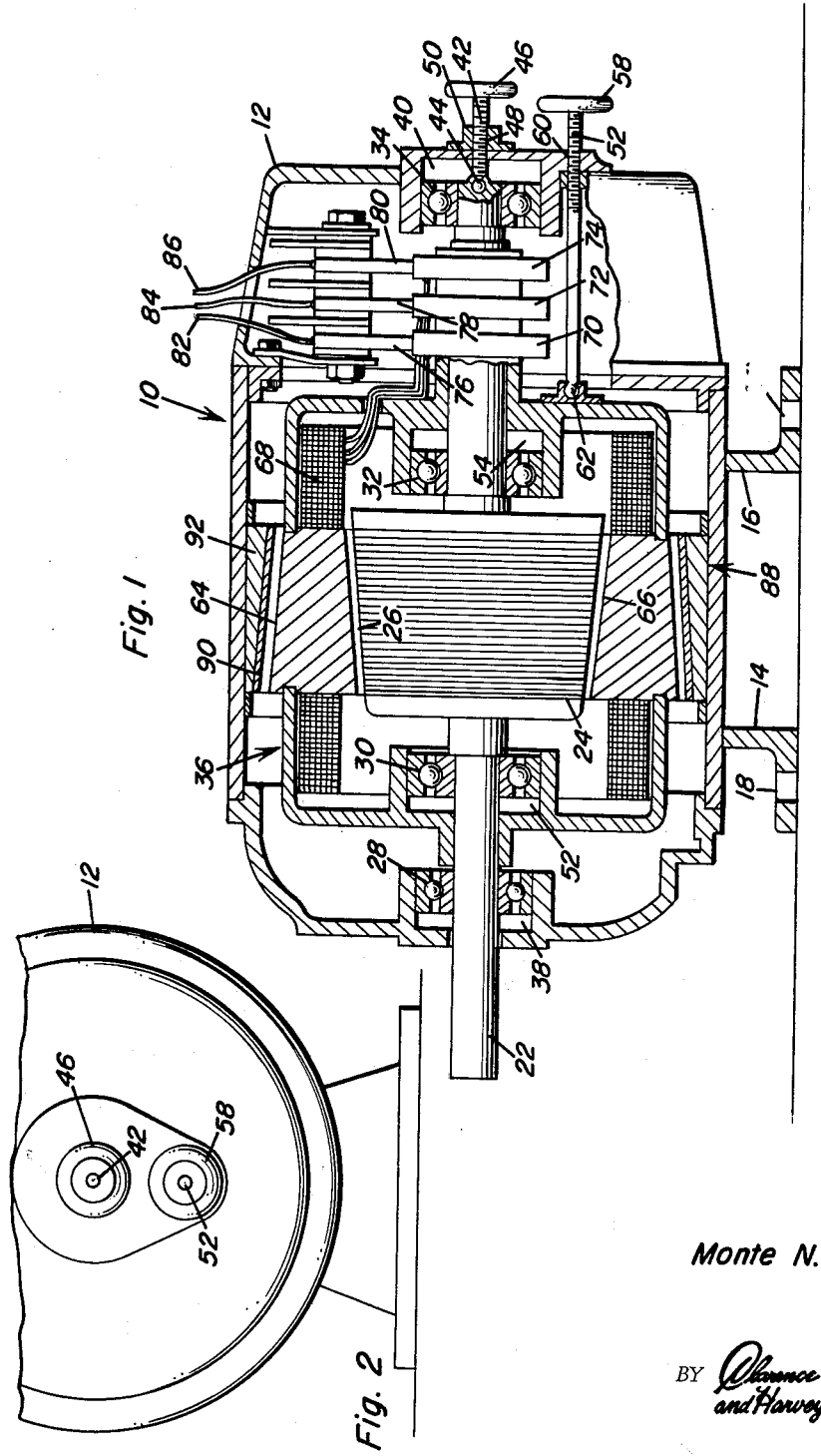
Monte N. Moore
INVENTOR.
BY *Clarence A. O'Brien*
*and Harvey B. Jacobson*
Attorneys Feb. 26, 1963  M. N. MOORE  3,079,518
ALTERNATING CURRENT INDUCTION MOTOR
Filed Dec. 22, 1959  2 Sheets-Sheet 2

Monte N. Moore
INVENTOR.

BY Clarence A. O'Brien
and Harvey B. Jacobson
Attorneys

United States Patent Office 3,079,518
Patented Feb. 26, 1963

3,079,518
ALTERNATING CURRENT INDUCTION MOTOR
Monte N. Moore, 2602 Leith St., Flint, Mich.
Filed Dec. 22, 1959, Ser. No. 861,403
16 Claims. (Cl. 310—115)

This invention relates generally to electrical equipment and more particularly to alternating current induction motors and novel means for controlling the speed and torque characteristics thereof.

It is well appreciated in the art that alternating current induction motors are extremely limited, with regard to a particular unit, in speed and torque characteristics. Conventional induction motors have rotatably mounted rotors that may mount armature windings such as that of a squirrel cage rotor and fixed stators concentrically positioned thereabout for producing the motor field. The stators have distributed windings wound thereon and out of phase voltages are impressed on the windings to create rotating motor fields about the rotor. Currents are induced in the rotor by the rotating magnetic field and, by Lenz's law, the armature currents finding themselves in the magnetic field tend to move across the field thereby imparting rotational motion to the rotor. The rotational speed of the rotating field is dependent upon the number of poles and the frequency of the exciting alternating current. The speed of the rotating field is called the synchronous speed and for example, a two-pole stator which is being excited by a voltage of 60 cycles per second, will rotate at 3600 r.p.m. The relationship between the rotor speed and the speed of the rotating field is equal to $1/S$ where S is equal to the slip. Of course, inasmuch as the induced currents are induced only when there is relative motion between the rotor and rotating field, the rotor speed may never equal the rotational speed of the rotating field; that is, S may never be equal to 1 but may approach 1 as a limit.

Various attempts have been made to devise methods to overcome the inherent limitations of induction motors by utilizing mechanical, hydraulic, electrical, and other auxiliary devices attached to the motor or in conjunction therewith. However, no means appear which may form a part of an induction motor allowing for controlling the characteristics thereof.

In view of the above, it is the principal object of this invention to provide a novel induction motor construction wherein improved means are provided for allowing for the adjustment of both the speed and torque characteristics thereof. It is contemplated that the adjustment be made selectively by manual means or that the induction motor be part of a servo-system wherein feedback controls are utilized to control the adjustments.

It is a further object of this invention to provide a novel induction motor construction wherein the stator includes a first stator section and a second stator section with said first stator section being concentrically mounted in the motor housing between the rotor and the second stator section. Further, the construction provides for the first stator section to be mounted for rotation relative to the rotor and the second stator section. Further, air gaps are disposed between the stator sections and between the first stator section and the rotor. The opposed surfaces defining the air gaps are tapered and the first stator section and rotor are longitudinally movable so as to enable the gaps to be varied.

More specifically, it is an object of this invention to provide novel motor control means which are typified by the three embodiments set forth below, each being particularly characterized by a rotatably mounted stator section.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a vertical sectional view through the induction motor comprising this invention and illustrating particularly the internal arrangement thereof;

FIGURE 2 is a fragmentary end elevational view of the motor construction;

Figure 3:
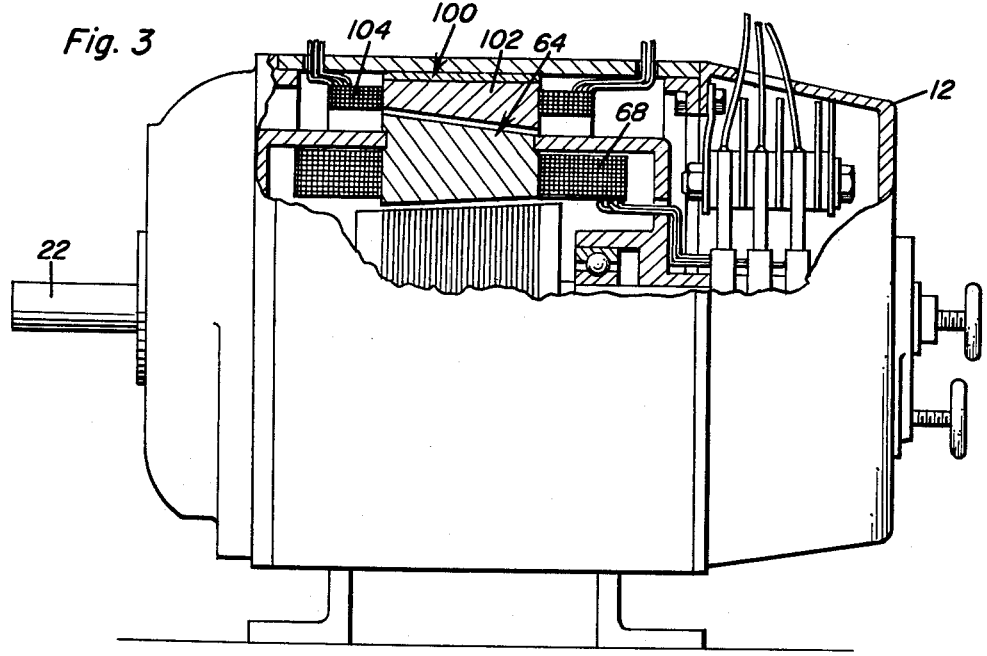
FIGURE 3 is an elevational view of a second embodiment of the invention, partially broken away, illustrating the internal motor construction.

With continuing reference to the drawings and initial reference to FIGURE 1, numeral 10 generally represents the improved induction motor construction including a motor housing 12 supported by feet 14 and 16 apertured at 18 and 20 for receiving retaining bolts therethrough.

The motor 10 is provided with a drive shaft 22 adapted to be loaded which is secured to the rotor 24. The rotor 24 has the shape of a conical frustum defining a tapered surface 26. The drive shaft 22 and rotor 26 are supported for rotation by ball bearings 28, 30, 32 and 34. The bearings 28 and 34 are disposed within cavities formed in the housing structure while the bearings 30 and 32 are received in cavities defined in a first rotating stator section support 36 for free or mechanically unloaded rotation thereof entirely within the housing or second stator section 88 as clearly shown in FIGURE 1. It is to be appreciated that the bearings 28 and 34 are longitudinally movable by sliding within the aforementioned cavities 38 and 40 respectively. A screw 42 extends through the housing 12 and a terminal ball 44 thereon is received in a socket formed in one end of the drive shaft 22. A handle 46 is provided on the screw 42 which is threaded at 48 through a boss 50 on the housing 12. By adjustment of the screw 42, the drive shaft 22 and rotor 26 may be moved longitudinally of the housing 12 as the bearings 28 and 34 slide within the cavities 38 and 40. Likewise, the bearings 30 and 32 may slide in the cavities 52 and 54 so as to enable the rotor 24 to be longitudinally moved with respect to the first stator section support 36. A second screw 56 having a handle 58 is threaded through the housing at 60 and a terminal ball 62 thereon is received within a socket secured to the first rotating stator section support 36. Therefore, by threading the screw 52 relative to the housing 12, the first stator section support 36 may be longitudinally moved relative to the housing 12 and also relative to the rotor 26.

The rotor 26 may be a conventional squirrel cage magnetic rotor formed of laminated magnetic material having the tapered surfaces as indicated.

The first rotating stator section support 36 carries the first stator section 64 formed of laminated and slotted magnetic material and also having a tapered surface 66 opposed to the surface 26 of the rotor 24. The tapered surfaces 26 and 66 of course define an air gap. An alternating current distributed winding 68 is wound about the first stator section 64 and the terminals thereof are connected respectively to slip rings 70, 72 and 74, each representing one phase. Stationary brushes 76, 78 and 80 are provided for contacting the slip rings 70, 72 and 74 and are in turn connected to conductors 82, 84 and 86 which are adapted to be electrically connected to a three-phase supply.

A second stationary stator section is provided concentric with the first stator section 64 and rotor 24 and is carried on the inner surface of the housing 12. The second stator section is generally designated as 88 and includes a bi-metal non-magnetic current conductor 90 which has a tapered surface as illustrated and a bi-metal magnetic flux conductor 92 which is sandwiched between the non-magnetic current conductor 90 and the housing 12. It is, of course, appreciated that an air gap is defined between the non-magnetic portion 90 and the first stator section 62.

It is thought that the basic construction of the motor forming the embodiment of FIGURE 1 should now be understood. When a rotating field is established in the winding 68, the field established across the air gap between the first stator section 64 and the rotor 24 causes the rotor to rotate at a speed less than the speed of the rotating field. When the rotational speed of the drive shaft 22 is retarded by mechanical loads, the first stator section 64 will assume a higher speed. The gap between the portion 90 and the first stator section 54 may be reduced by utilization of the screw 52 causing a partial shift in the magneto motor force into the portion 90, thereby retarding the speed of the first stator section 64 causing an increase in the magneto motor force in the first stator section 64 and an increase in torque of the rotor 24 and drive shaft 22 to compensate for the increased mechanical load. The gap between the rotor 24 and first stator section 66 may now be reduced causing a greater torque increase in the rotor 24 as the rotation of the first stator section 64 is further retarded by the flux in portion 90 acting on the first stator section 64. The torque and speed of the first stator section 64 is thereby increased along with the rotor 24 and drive shaft 22. It will be understood that by utilizing the screws 42 and 52 to reduce or increase the gaps between the first stator section and the portion 90 or the first stator section and the rotor 24, the magneto motor force flux shifts between the elements indicated provide a range of variable torque and speed drive shaft 22.

FIGURE 2 illustrates a fragmentary end view of the motor of FIGURE 1 illustrating particularly the handles 58 and 46 of the screws 52 and 42.

Attention is now called to FIGURE 3 wherein the second stator section including the portions 90 and 92 of FIGURE 1 are replaced by a second stator section 100 including an electro-magnetic laminated stator 102 having a distributed winding 104 wound thereon. In this embodiment, the distributed winding 104 is electrically connected to the winding 68 on the first stator section 64 so as to provide counter-acting rotating magnetic fields or, a stator and a rotating magnetic field. By distributing the stator windings between the first stator section 100 and the rotating stator section 64, virtually the same degree of control of the speed and torque of the drive shaft 22 may be exercised. Aside from the change of the second stator section in the embodiment of FIGURE 3, the remaining construction is identical to that described in FIGURE 1.

Figure 4:
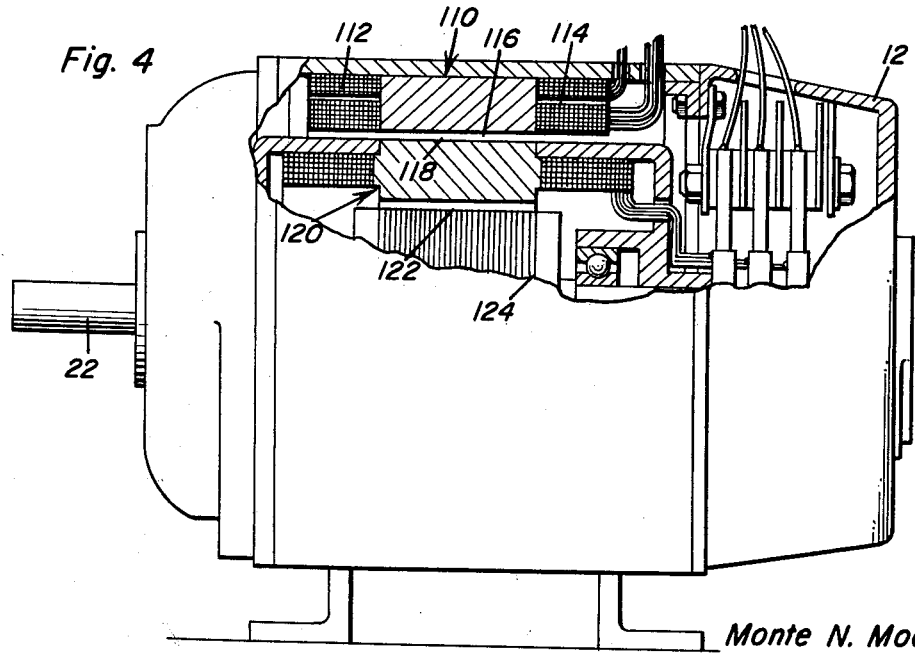
FIGURE 4 is an elevational view of a third embodiment of the invention, partially broken away, illustrating particularly the distinctive internal configuration thereof.

Attention is now drawn to the embodiment of FIGURE 4 wherein a second stator section 110 is provided and includes a direct current control winding 112 along with an alternating current polyphase distributed winding 114. In the embodiment of FIGURE 4, the opposed surfaces as 116 on the second stator section 110, 118 on the first stator section 120, and 122 on the rotor 124, are formed parallel. Accordingly, no attempt is made in this embodiment to vary the gaps between the first and second stator sections and the first stator section and the rotor. The embodiment of FIGURE 4 is similar in construction and operation to the embodiment of FIGURE 3, except for the fact that the direct current winding 112 is provided for setting up magnetic flux saturation in the magnetic portion of the second stator section 110. The direct current winding 112 is separately energized and by controlling the saturation of the magnetic portion of the second stator section 110 an increase or decrease in the flux intensity thereof may be controlled so as to change the rotating action of the first stator section 120.

From the foregoing, it will be apparent that improved means have been provided for providing improved control of torque and speed characteristics of an induction motor. Each of the embodiments is characterized by a squirrel cage rotor and a distributed winding in an iron stator which is split in two sections, one being stationary and the other being free to rotate in air gaps between the rotor and the fixed stator section. It has been shown that the winding distributed in the two sections of the split stator may be connected electrically through external control devices. Mechanical means may also be utilized to vary the magnetic flux air gaps to change the magnetic flux, density, position and direction in and across the iron mass of the split stator so as to increase or decrease the speed of the electromagnetic rotating section in relation to the rotor and fixed section of the stator.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An alternating current induction motor including improved means for controlling the speed and torque characteristics thereof comprising in cobination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a non-magnetic current conductor portion, and a magnetic flux conductor portion, said magnetic portion bonded to said housing sandwiched between said non-magnetic portion and said housing.

2. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a non-magnetic current conductor portion, and a magnetic flux conductor portion, said magnetic portion bonded to said housing sandwiched between said non-magnetic portion and said housing, a first air gap disposed between said non-magnetic conductor and said first stator section, a second air gap disposed between said first stator section and said rotor, said gaps being defined by tapered opposed surfaces, and first means for longitudinally moving said first stator section whereby said first and second air gaps may be varied.

3. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a non-magnetic current conductor portion, and a magnetic flux conductor portion, said magnetic portion bonded to said housing sandwiched between said non-magnetic portion and said housing, a first air gap disposed between said non-magnetic conductor and said first stator section, a second air gap disposed between said first stator section and said rotor, said gaps being defined by tapered opposed surfaces, and first means for longitudinally moving said first stator section whereby said first and second air gaps may be varied, and second means for longitudinally moving said rotor whereby said second air gaps may be varied.

4. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a magnetic flux conductor bonded to said housing having a second distributed winding wound thereon, said first and second distributed windings being electrically connected.

5. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a magnetic flux conductor bonded to said housing having a second distributed winding wound thereon, said first and second distributed windings being electrically connected, a first air gap disposed between said second stator section and said first stator section, a second air gap disposed between said first stator section and said rotor, said gaps being defined by tapered opposed surfaces, and first means for longitudinally moving said first stator section whereby said first and second air gaps may be varied.

6. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a magnetic flux conductor bonded to said housing having a second distributed winding wound thereon, said first and second distributed windings being electrically connected, a first air gap disposed between said second stator section and said first stator section, a second air gap disposed between said first stator section and said rotor, said gaps being defined by tapered opposed surfaces, and first means for longitudinally moving said first stator section whereby said first and second air gaps may be varied, and second means for longitudinally moving said rotor whereby said second air gap may be varied.

7. An alternating current induction motor including improved means for controlling the speed and torque characteristics thereof comprising in combination with a housing having a rotatable magnetic rotor mounted therein, a first rotating stator section concentrically mounted for rotation about said rotor, said first stator section having a first distributed winding wound thereon, and a second stator section concentrically positioned outwardly of said first stator section and carried by said housing, said second stator section including a magnetic flux conductor bonded to said housing having a second distributed winding wound thereon, said first and second distributed windings being electrically connected, and a direct current winding wound on said second stator section whereby magnetic flux saturation may be set up in said second stator section.

8. An electric motor comprising, housing means, load driving armature rotor means rotatably mounted by the housing means, motor field establishing means mounted in mechanically unloaded condition within the housing means to produce a magnetic field rotating relative to the rotor means and means operative independently of current variations in the rotor means and field establishing means for selectively varying the magnetic flux density of the rotating magnetic field passing through the rotor means and housing means.

9. The combination of claim 8, wherein the motor field establishing means includes rotatable stator means rotatably mounted in completely enclosed relation within the housing means for rotation relative to the rotor means and housing means, and rotating winding means mounted on the rotatable stator means for rotation therewith.

10. The combination of claim 8, including fixed winding means mounted on the housing means and having a portion electrically connected to the field establishing means.

11. The combination of claim 8, wherein the means for selectively varying the magnetic flux density comprises adjusting mechanism operatively connected to the rotor means and motor field establishing means for dimensionally varying the magnetic flux paths of the magnetic field passing through the rotor means and housing means.

12. The combination of claim 11, wherein the motor field establishing means includes rotatable stator means rotatably mounted in enclosed relation within the housing means for rotation relative to the rotor means and housing means, and rotating winding means mounted on the stator means for rotation therewith.

13. The combination of claim 11, wherein the means for selectively varying the magnetic flux density comprises control winding means mounted on the housing means for controlling core saturation of the fixed winding means.

14. The combination of claim 9, including fixed winding means mounted on the housing means and electrically connected to the field establishing means.

15. In a system for controlling the speed and torque characteristics of an induction motor including an armature rotor and a field establishing stator assembly having a rotatable stator winding and a fixed stator winding cooperating therewith to establish a rotating field; means for operatively connecting said armature rotor to a load, rotor means for mounting said rotatable stator winding in mechanically unloaded condition, and means for controlling the core saturation of said fixed stator winding to vary the flux density of the field established by said field establishing stator assembly.

16. In a system for controlling the speed and torque characteristics of an induction motor including an armature rotor and a field establishing stator assembly having a rotatable stator winding; means for operatively connecting said armature rotor to a load, means for rotatably mounting said rotatable stator winding in mechanically unloaded condition and in axially slidable relation to the armature rotor, and flux gap control means for adjustably positioning the rotatable stator winding in axial relation to the armature rotor for controlling the speed and torque conditions of the armature rotor.

References Cited in the file of this patent

UNITED STATES PATENTS

| 2,020,945 | Hild | Nov. 12, 1935 |
| 2,677,256 | Donandt | May 4, 1954 |